United States Patent [19]

Ruiter

[11] Patent Number: 5,220,984
[45] Date of Patent: Jun. 22, 1993

[54] SHIFT MECHANISM

[75] Inventor: Andrew K. Ruiter, Spring Lake, Mich.

[73] Assignee: Grand Haven Stamped Products Company, (Div. of JSJ Corporation), Grand Rapids, Mich.

[21] Appl. No.: 870,900

[22] Filed: Apr. 20, 1992

[51] Int. Cl.$^5$ .................... B60K 41/26; B60K 41/28
[52] U.S. Cl. .................... 192/4 A; 70/248; 74/475; 74/529
[58] Field of Search .............. 192/4 A; 74/475, 529; 200/61.88; 70/248, 254

[56] References Cited

U.S. PATENT DOCUMENTS

| 1,254,349 | 1/1918 | Patch | 200/61.88 |
| 4,473,141 | 9/1984 | Mochida | 74/475 X |
| 4,880,092 | 11/1989 | Kito et al. | 192/4 A |
| 4,887,702 | 12/1989 | Ratke et al. | 192/4 A |
| 4,905,802 | 3/1990 | Gotoh | 192/4 A |
| 4,909,096 | 3/1990 | Kobayashi | 192/4 A X |
| 4,947,967 | 8/1990 | Kito et al. | 192/4 A |
| 5,003,799 | 4/1991 | Imai et al. | 192/4 A X |
| 5,015,807 | 5/1991 | Ishizuki et al. | 200/61.88 |
| 5,018,610 | 5/1991 | Rolinski et al. | 192/4 A |
| 5,062,509 | 11/1991 | Carpenter et al. | 192/4 A |
| 5,096,033 | 3/1992 | Osborn | 192/4 A |

FOREIGN PATENT DOCUMENTS

| 50-54733 | 9/1975 | Japan . | |
| 5742424 | 8/1980 | Japan . | |
| 0022627 | 1/1989 | Japan | 74/475 |
| 0063426 | 3/1989 | Japan | 192/4 A |

Primary Examiner—Rodney H. Bonck
Attorney, Agent, or Firm—Price, Heneveld, Cooper, DeWitt & Litton

[57] ABSTRACT

A shift mechanism for a vehicle includes a detent plate having a notch defining a park gear position, a shift lever with a handle, the shift lever being pivotally movable with respect to the detent plate, and a solenoid driven slideable plate movably attached to the shift lever and having a pawl-like tooth for engaging the notch and holding the shift lever in the park gear position. A solenoid is mounted to the shift lever and directly connected to the slideable plate for controlling the movement of the slideable plate, and hence in turn controlling the movement of the shift lever out of the park gear position. The solenoid includes a solenoid coil which is operably connected to a manually actuatable switch located on the shift lever handle.

22 Claims, 4 Drawing Sheets

SHIFT MECHANISM

This invention relates generally to a system for controlling the shifting of a lever for a vehicle transmission, and more particularly to an electrically operated detent engaging system for holding the shift lever in the park position against rotation to other gear positions.

BACKGROUND OF THE INVENTION

In vehicles which are equipped with automatic transmissions, the shift lever is movable from a park position to other gear positions such as reverse, neutral, drive, second gear and first gear. The shift lever is generally associated with a detent plate and detent pawl for releasably holding the lever in the park position, and an actuator means is provided for actuating the pawl to release the shift lever for movement to the other gear positions. The actuator means most commonly utilized in these shifters involves mechanical actuating means which require some degree of sophistication during assembly to assure manufacture of a high quality product, and also requires several unique parts for the assembly. Hence, alternative designs using standardized parts and which are easier to assemble with less chance of error are desired.

Also, in shifting from the park position to the other gear positions, problems have been encountered in the unattended acceleration of the vehicle and, therefore, efforts have been made to prevent the shifting of the shift lever until the brake pedal has been depressed or other preconditions are satisfied so that the vehicle will not move before it is intended by the driver. The efforts thus far have generally been directed to mechanically or electrically actuated mechanisms for blocking the movement of the detent pawl until such time as the preconditions are satisfied. The result is that these mechanisms have become very complicated. Further, these mechanisms tend to include multiple moving parts which involve extra assembly and cost. For example, typically, a blocking member is movably mounted to the shift mechanism and is manually or electrically moved between a blocking position so that the blocking member physically prevents the pawl from disengaging the detent plate, and a release position so that the blocking member allows shift lever to move. U.S. Pat. No. 5,096,033 discloses an example of such an arrangement.

However, these blocking members by design, only provide for an indirect control of the pawl. Further, the known constructions emphasize mechanical mechanisms which are costly to manufacture and assemble at a level of quality which is necessary in this application. Further, the mechanical mechanisms are often difficult to adapt to various shifter designs and require special parts, tooling, and testing procedures.

An object of the present invention is to provide a simplified lower cost version of a shift mechanism for preventing a driver from shifting a shift lever from park gear position to another gear position unless the brake is applied.

Another object is to provide a detent mechanism which is readily adaptable to a variety of different vehicle shifter and electrical systems.

SUMMARY OF THE INVENTION

The present invention includes a shift mechanism for a vehicle having a transmission, the shift mechanism including a detent means defining a park gear position and at least one drive gear position, and a shift lever operably connected to the transmission and to the detent means, the shift lever being shiftable between the park gear position and the drive gear position. The shift mechanism further includes a pawl means for retaining the shift lever in the park gear position, a solenoid means attached to the pawl means for moving the pawl means between the engaged condition and the disengaged condition with the detent means, the solenoid means directly controlling the condition of the pawl means, and manually actuated switch means operably connected to the solenoid means for controlling the solenoid means.

The present invention provides several advantages over known prior art. Fewer and more standardized parts can be used. Further, assembly is simplified and control over quality is made easier. Also, the invention can be readily adapted to various shifters and vehicle electrical systems.

These and other features, objects and advantages of the present invention will become apparent upon reading the following description thereof together with reference to the accompanied drawings in which:

DETAILED DESCRIPTION OF THE PREFERRED EMBODIMENTS

Figures 2, 3, 4:
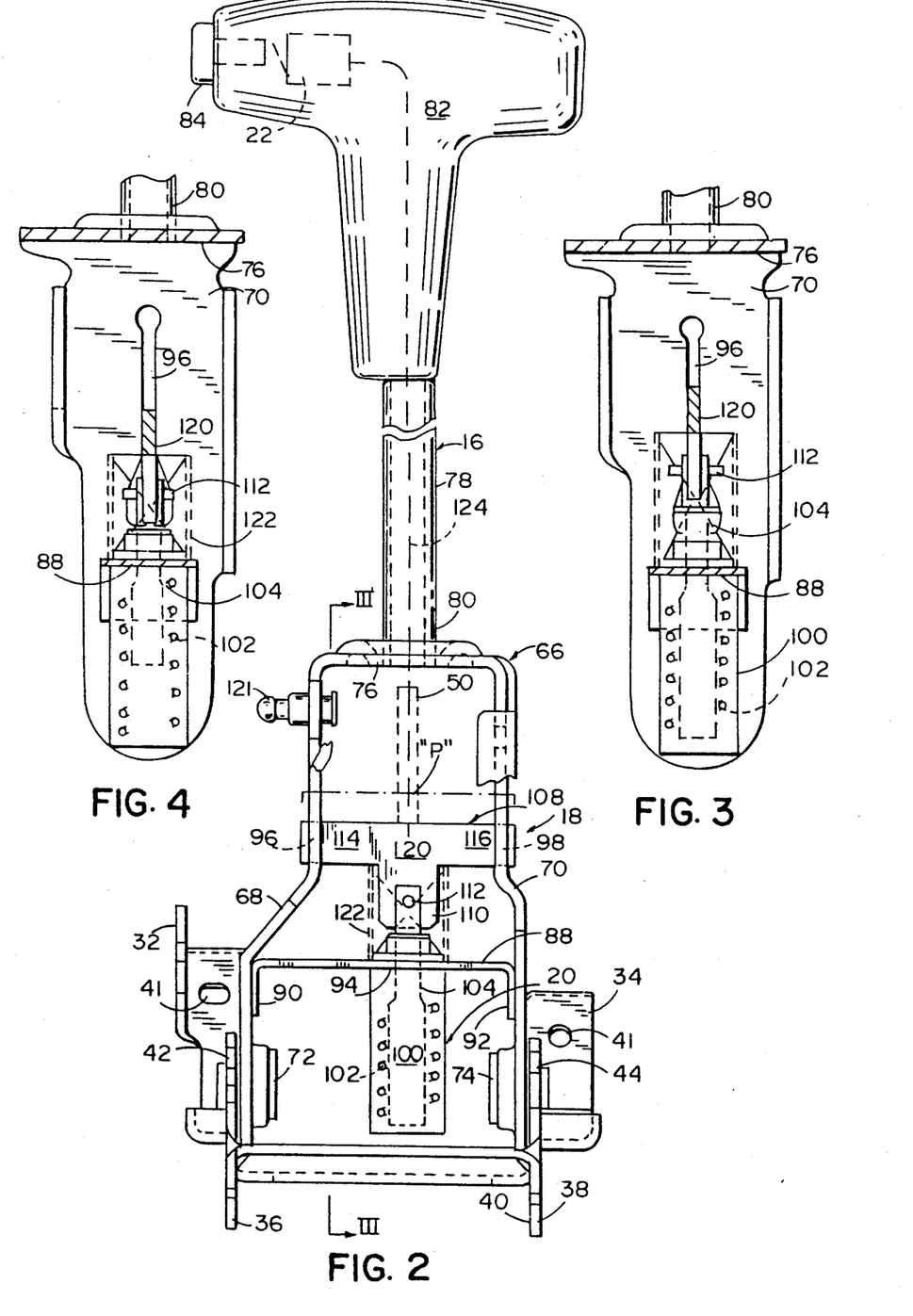
FIG. 2 is a front elevational view of the shift mechanism shown in FIG. 1 but with the detent plate removed for clarity.
FIG. 3 is an enlarged fragmentary cross-sectional view taken along the plane III—III in FIG. 2, the pawl means being shown in the raised position.
FIG. 4 is a fragmentary cross-sectional elevational view similar to FIG. 3 but with the pawl means in the lowered disengaged position.

For purposes of description herein the terms "upper," "lower," "right," "left," "rear," "front," "vertical," "horizontal," and derivatives thereof shall relate to the invention as oriented in FIG. 2.

A shift mechanism 10 (FIG. 1) embodying the present invention includes a shift mechanism frame 12 with a detent plate 14 extending upwardly therefrom, and a shift lever assembly 16 pivotally attached to shift mechanism frame 12. Shift lever assembly 16 includes a movable pawl 18, and a solenoid 20 operably connected to pawl 18 for moving the pawl into and out of engagement with detent plate 14. Solenoid 20 is controlled by a manually actuatable shift button switch 22 located on shift lever assembly 16, button switch 22 being part of an electrically circuit 24 (FIG. 5) so that solenoid 20 can only be actuated, when shift lever assembly 16 is in the park position, if the vehicle brake (not shown) is depressed. By this arrangement, a shift mechanism 10 is provided with a minimum of moving parts and mechanical linkages, and has an improved assembleability. Further, shift mechanism 10 is compatible with a wide variety of automotive electrically systems.

Shift mechanism frame 12 (FIGS. 1 and 2) includes a base 28 adapted to be attached to the floor of a vehicle. Such attachment systems are generally known in the art of transmission shift mechanisms and are only briefly described below. Base 28 includes a generally planar central body 30 that is shaped as desired to mateably engage the floor of the vehicle. Front flanges 32 and 34 and rear flanges 36 and 38 extend from central body 34 and include hook-like tabs 40 (FIG. 1) and/or attachment holes 41 (FIG. 2) to facilitate attachment to the vehicle floor. Two side flanges 42 and 44 extend upwardly from opposing sides of central body 30 for pivotally mounting shift lever assembly 16.

Detent plate 14 (FIG. 1) has an inverted U-shape and is securely attached to base 28 at ends 46 and 48 with the central portion 50 arching over the middle of base 28. Ends 46 and 48 include flanges permitting detent plate 14 to be securely attached to base 28 by rivet-like fasteners 52. Detent plate 14 includes an upper contoured surface 54 with grooves 56 therein and a lower surface 58 with notches 60 therein. Grooves 56 and notches 60 correspond to the various positions to which shift lever assembly 16 can be shifted, such as "PARK" (P), "REVERSE" (R), "NEUTRAL" (N), "DRIVE" (D), "SECOND GEAR" (2 ND), and "FIRST GEAR" (1 ST). In particular, notches 60 receive pawl 18 while grooves 56 receive a spring biased roller 62 attached to shift lever 12. Spring biased roller 62 which is attached to shift lever assembly 16 on a center piece 76 as noted below, provides an improved "feel" as the operator shifts between gears.

Shift lever assembly 16 (FIG. 2) includes a U-shaped carrier 66 with downwardly extending arms 68 and 70 that straddle central portion 50 of detent plate 14 and pivotally connect to side flanges 42 and 44 by bearings/pivot pins 72 and 74. Shift lever assembly 16 pivots on shift mechanism frame 12 on pivot pins 72 and 74 between various positions, such as the illustrated position "A" (FIG. 1) which indicates the centerline of tubular post 78 when shift lever assembly 16 is in the park gear position, and the illustrated position "B" which illustrates the drive gear position. U-shaped carrier 66 further includes a bight portion 76 to which a tubular post 78 is connected at a lower end 80. Post 78 extends upwardly and terminates in a handle 82. Handle 82 is shaped to provide a widened gripping surface for comfort of the operator, and also includes an outwardly biased push button 84. In FIG. 2, push button 84 is shown as depressed in solid lines and as released in phantom lines. Button switch 22 is located inside of handle 82 and can be operated by pressing button 84.

Shift lever assembly 16 (FIG. 2) includes a saddle bracket 88 that extends between arms 68 and 70 of U-shaped carrier 66 and securely attaches thereto at end flanges 90 and 92 such as by welding or riveting. Saddle bracket 88 is positioned below central portion 50 of detent plate 14, and includes an aperture 94 substantially aligned with detent plate 14. Slots 96 and 98 are formed in arms 68 and 70 and extend vertically upwardly above saddle bracket 88.

Solenoid 20 (FIG. 2) includes a solenoid housing 100 attached to saddle bracket 88 and aperture 94. A solenoid coil 102 and solenoid retractable pin 104 are operably positioned in housing 100, with pin 104 extending upwardly above housing 100. A pawl means in the form of a slideable plate 108 is attached to the terminal end of solenoid pin 104. Slideable plate 108 is T-shaped and includes a lower leg 110 attached to pin 104 by pivot pin 112, and to opposing wings 114 and 116 that slideably engage slots 96 and 98 in arms 68 and 70, respectively. The center of slideable plate 108 forms a tooth or pawl 120 which engages notches 60 in detent plate 14. A coil spring 122 positioned around lower leg 110 and the terminal end of solenoid pin 104 biases slideable plate 108 and solenoid pin 104 to a normally engaged and extended position. When solenoid coil 102 is actuated, solenoid pin 104 is caused to retract. This in turn causes slideable plate to move downwardly and disengage tooth 120 from notches 60 in detent plate 14. Switch 22 is connected to solenoid coil 102 by wires 124 that extend from switch 22 through handle 82 and tubular post 78 to solenoid housing 100. Other means for attaching to shift lever assembly 16 are provided such as ball joint 121 which connects to the control cable (not shown) extended between shift lever assembly 16 and the vehicle transmission.

Figure 5:
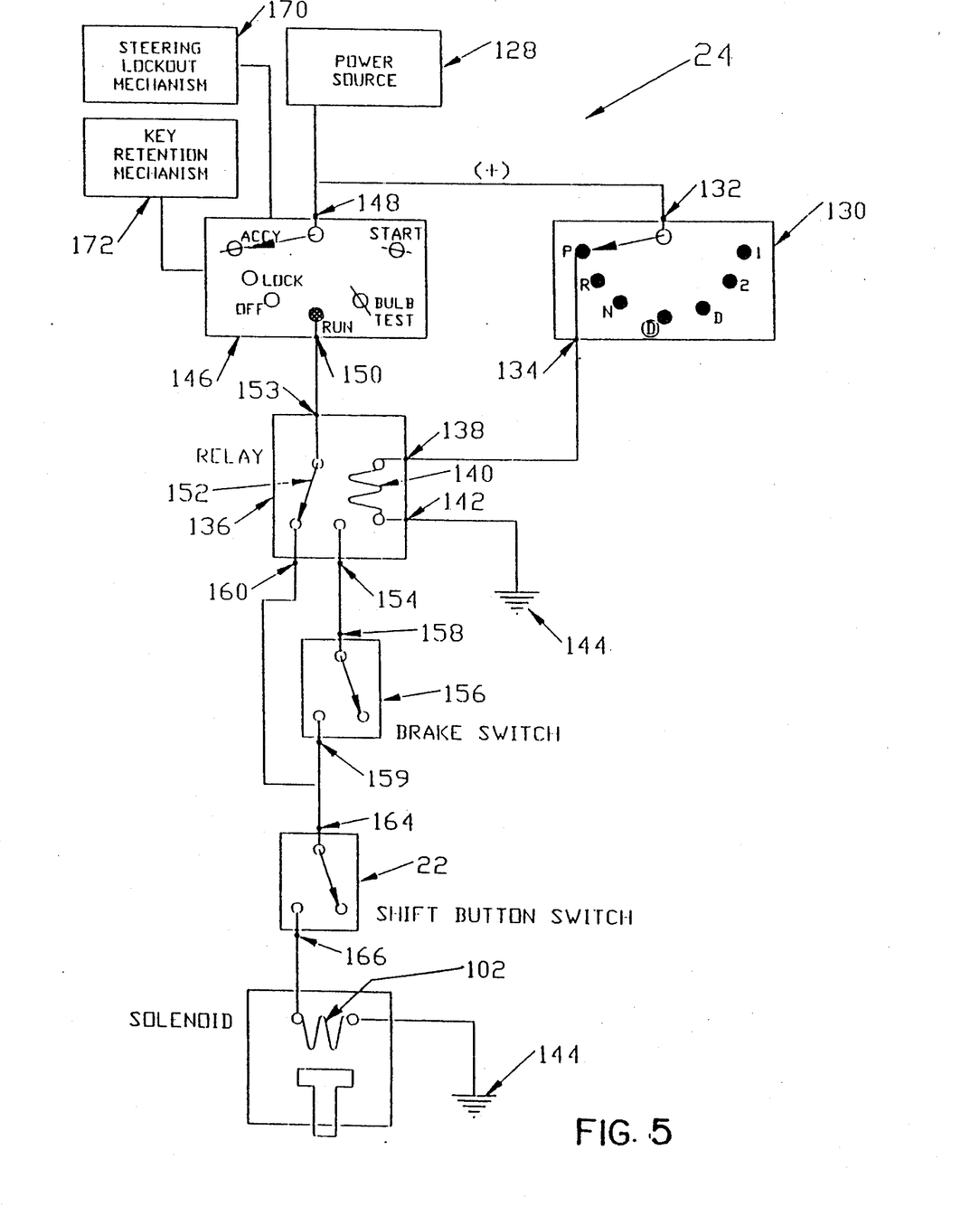
FIG. 5 is an electrically schematic for the shift mechanism shown in FIG. 1.

Referring to FIG. 5, control circuit 24 discloses switch 22 and solenoid coil 102 operably connected to a power source 128 such as a battery as noted below. Power source 128 is connected to shift lever position switch or transaxle switch 130 at an input terminal 132. When shift lever position switch 130 indicates that the shift lever 12 is in the park (P) position, continuity is provided from input terminal 132 to output terminal 134. Output terminal 134 is connected to relay 136 at input terminal 138. Relay input terminal 138 is connected through relay coil 140 to relay output terminal 142 and to ground 144.

Power source 128 is also connected to an ignition switch 146 at input terminal 148. When ignition switch 146 is in the "on" or "run" position, continuity is provided from input terminal 148 to output terminal 150. Ignition switch output 150 is connected to relay switch 152 on relay 136, which relay switch 152 is operated by relay coil 140. With relay coil 140 energized, relay switch 152 provides continuity from relay switch input terminal 153 to relay switch output terminal 154. Output terminal 154 is connected to brake switch 156 at input terminal 158. Brake switch 156 is normally open, but closes when the vehicle brake pedal (not shown) is depressed. When the vehicle brake pedal is depressed, continuity is provided from brake switch input terminal 158 to brake switch output terminal 159.

When relay coil 140 is not energized, relay switch 152 provides continuity from relay switch input terminal 153 to relay switch second output terminal 160. Both relay switch output terminal 160 and brake switch input terminal 159 are connected to shift button switch 22 at switch button input terminal 164. Shift button switch 22 is normally open, but provides continuity from shift button switch input terminal 164 to shift button switch output terminal 166 when button 84 is depressed. Button switch output terminal 166 is connected through pawl solenoid coil 102 to ground 144.

As illustrated in FIG. 5, ignition switch 146 can be operably connected to a steering lockout mechanism 170 or ignition key retention mechanism 172 to prevent unacceptable conditions to occur before ignition switch 146 can be switched to a "lock" position. Such mechanisms are disclosed in U.S. Pat. No. 5,096,033 issued Mar. 17, 1992 to Osborn, entitled LOCKOUT MECHANISM AND SYSTEM FOR VEHICLE SHIFTER, the entire contents of which is hereby incorporated by reference.

OPERATION

Figure 1:
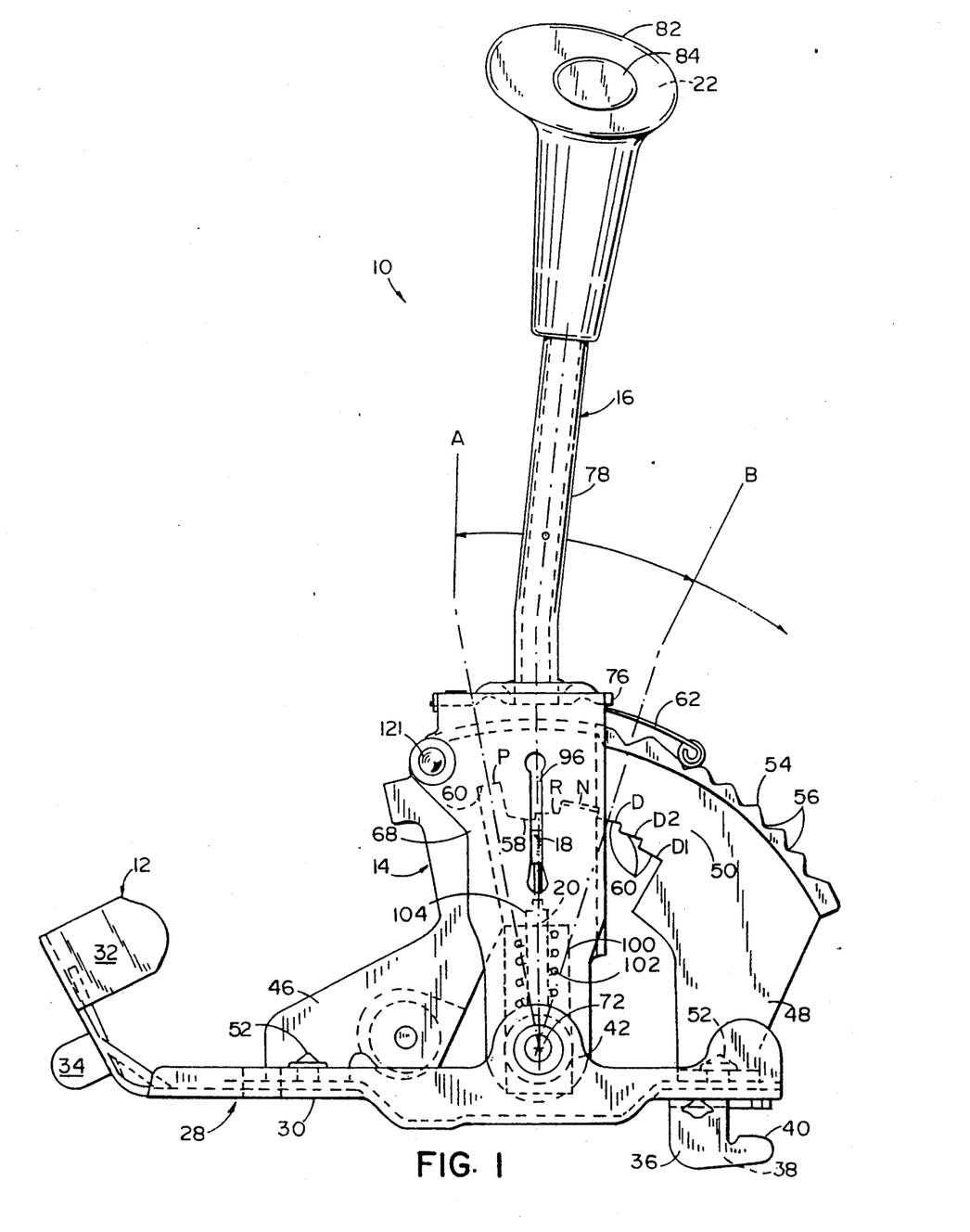
FIG. 1 is a side elevational view of a vehicle transmission shift mechanism embodying the present invention.

Having described our apparatus and system, the operation of this invention will become apparent to one skilled in the art. In operation, beginning with shift lever assembly 16 in the park position "A" (FIG. 1), solenoid pin 104 is fully extended and tooth 18 seated in notch "P". Power source 128 (FIG. 5) is attached to the vehicle electrical system so it becomes powered as the vehicle ignition system becomes powered. For example, a switch (not shown) can be connected to power source 128 so that as ignition switch 146 is turned from "lock" position toward the "off" position, current is communicated from power source 128 through shift lever position switch 130 and through relay coil 140 to ground 144. This energizes relay coil 140 causing relay switch 152 to move to the second position so that continuity is provided from relay switch input terminal 153 to second output terminal 154 and to brake switch 156. As ignition switch 146 is turned to the "run" position, voltage is communicated through ignition switch 146 and relay switch 152 to brake switch 156. Brake switch 156 and shift button switch 22 are normally open and thus current does not flow through brake switch 156 and shift button switch 22 until both switches are closed by an operator depressing the vehicle brake pedal and also depressing shift button 84. At such time, current is communicated through switches 146, 152, 156 and 22 to solenoid coil 102 and to ground 144. This energizes solenoid coil 102 causing solenoid pin 104 and in turn slideable plate 108 to retract. As slideable plate 108 retracts, tooth 18 disengages from notch "P" allowing shift lever assembly 16 to be moved to a drive gear position such as noted by the drive gear position "B" (FIG. 1).

As shift lever assembly 16 is moved out of park gear position, shift lever position switch 130 breaks the flow of current from power source 128 to relay coil 140. This causes relay switch 152 to return to a normal position so that continuity is provided from relay input terminal 153 to second relay output terminal 160. Hence, voltage is communicated from power source 128 to ignition switch 146 and to shift button switch 22. Thus, once shift lever assembly 16 is out of park, the brake pedal need not be depressed to close brake switch 156 to shift between gear positions. Solenoid coil 102 continues to hold pin 104 and slideable plate 108 in a retracted position until shift button switch 22 is opened by releasing push button 84. At such time, coil spring 122 causes solenoid pin 104 and slideable plate 108 and in particular tooth 120 to extend and re-engage one of notches 60. If the tooth 120 is aligned with the notch "P", shift lever assembly 16 is once again held in the park gear position and can not be moved.

With shift lever assembly 16 in the park gear position, ignition switch 146 can be turned to the "lock" position. At such time, key retention mechanism 172 releases the ignition key and steering lock mechanism 170 disables the steering mechanism of the vehicle by locking it.

MODIFICATION

Figure 6:
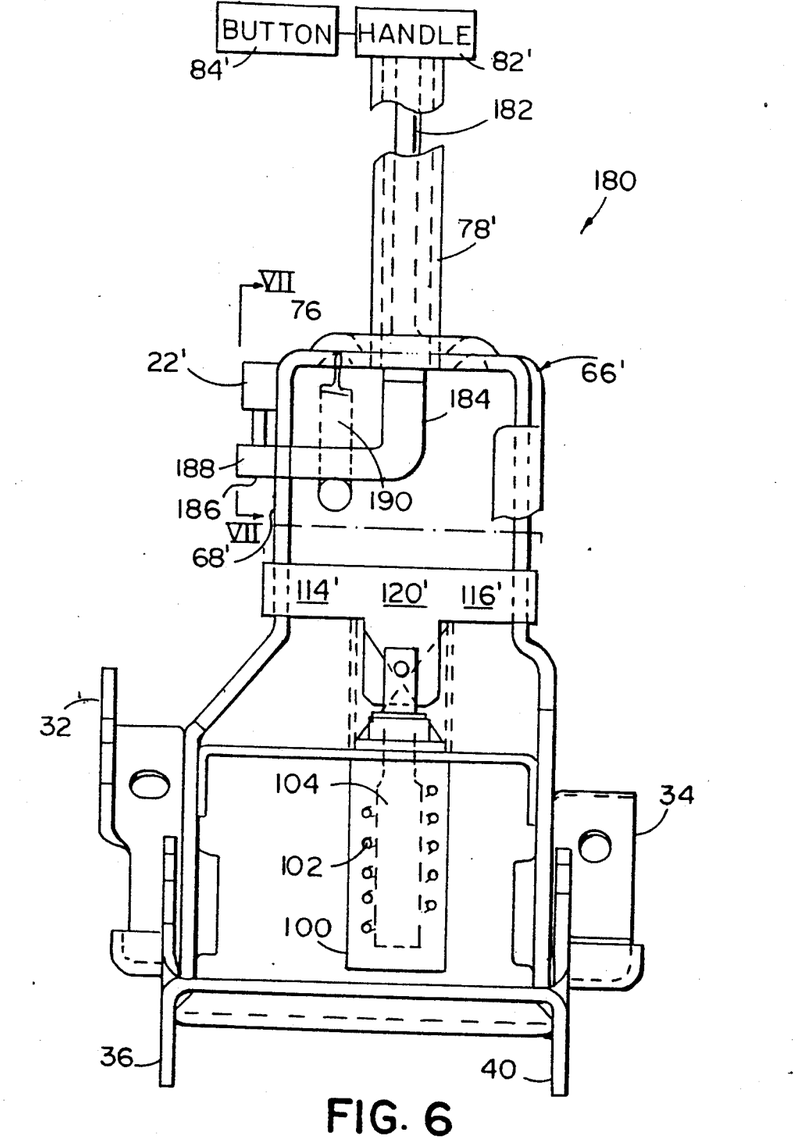
FIG. 6 is a modification of the shift mechanism shown in FIG. 1.
Figure 7:
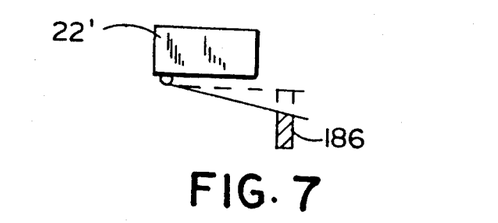
FIG. 7 is a partial side elevational view of the switch and pawl means shown in FIG. 6.

A modification of shift mechanism 10 is shown in FIGS. 6 and 7, the modification being generally referred to as shift mechanism 180. In shift mechanism 180, all parts similar to shift mechanism 10 are shown as having similar numbers but with use of a prime adjacent the number. In shift mechanism 180, a rod 182 is slideably positioned within tubular post 78'. Rod 182 is operably attached to button 84' by means known in the art, such as by cammed surfaces (not shown) that forces rod 182 downwardly as button 84' is pressed inwardly. The lower end 184 of rod 182 includes a bent laterally extending pawl-like leg 186 that extends through a slot 188 in arm 68' of U-shaped carrier 66'. A spring 190 is attached between pawl-like leg 186 and centerpiece 76' of U-shaped carrier 66', spring 190 biasing rod 182 to a normally raised position. A switch 22' is mounted to the side of arm 68 and is positioned to be contacted and closed by a pawl-like leg 186 as rod 182 is moved to the raised position. When button 84' is pressed, rod 182 drops downwardly causing pawl-like leg 186 to open switch 22'. This arrangement is contemplated to be most useful/desirable where a manufacture wishes to maximize use of existing tooling and parts, but where the benefit of the present invention is still desired.

It is to be understood that the invention may assume various alternative orientations, except where expressly specified to the contrary. It is also to be understood that the specific devices and processes illustrated in the attached drawings, and described in the following specification are simply exemplary embodiments of the inventive concepts as defined in the appended claims. Hence, specific inventions and other physical characteristics relating to the embodiments disclosed herein are not be considered as limiting, unless the claims expressly state otherwise. In particular, it will become apparent to those skilled in the art that various modifications to the preferred embodiment of the invention can be made without departing from the spirit or scope as defined by the appended claims.

The embodiments of the invention in which an exclusive property or privilege is claimed are defined as follows:

1. A shift mechanism for a vehicle having a transmission, comprising:
   a detent plate having notches defining a park gear position and at least one drive gear position;
   pawl means receivable in said notches for retaining said shift lever in the park gear position or said drive gear position;
   a shift lever operably connected to the transmission and to said detent plate and pawl means, said shift lever being shiftable between said park gear position and at least one drive gear position, said shift lever including a hand grip;
   said pawl means being attached to and movable with said shift lever relative to said detent plate and movable relative to said shift lever between an engaged condition and a disengaged condition with said detent plate;
   solenoid means attached to said pawl means for moving said pawl means between said engaged condition and said disengaged condition to control said pawl means; and
   manually actuated switch means operably connected to said solenoid means for controlling said solenoid means, said switch means including a switch actuator mounted proximate said hand grip.

2. A shift mechanism as defined in claim 1 wherein said detent means includes a detent plate having notches therein, at least one of said notches defining said park gear position, and said pawl means includes a tooth movably connected to said shift lever and engageable with said detent plate notches to retain said shift lever in at least said park gear position, and wherein solenoid means includes a solenoid operably connected to said tooth for controlling the engagement of said tooth with said notches.

3. A shift mechanism as defined in claim 2 wherein said solenoid is fixedly attached to said shift lever and said tooth is movably attached to shift lever, said solenoid and said tooth being movable with said shift lever as said shift lever is moved between said park gear position and said at least one drive gear position.

4. A shift mechanism as defined in claim 2 including a shift mechanism frame adapted to attach to the vehicle, said detent plate being secured to said shift mechanism frame, and wherein said shift lever includes a U-shaped carrier pivotally mounted to said shift mechanism frame, said tooth being movably mounted to said U-shaped carrier.

5. A shift mechanism as defined in claim 4 wherein said U-shaped carrier includes a saddle bracket, and said solenoid is operably mounted to said saddle bracket and moves therewith as said shift lever is pivotally moved on said shift mechanism frame.

6. A shift mechanism as defined in claim 1 including a shift mechanism frame adapted to attach to the vehicle, said shift lever being movably mounted to said shift mechanism frame, and wherein said switch means is mounted on said shift lever and movable therewith.

7. A shift mechanism as defined in claim 6 wherein said detent means defines a path defining said park gear position and said at least one drive gear position, and wherein said shift lever includes a U-shaped carrier movably mounted to said shift mechanism frame and movable along said path, said solenoid means and said pawl means being mounted to said U-shaped carrier and movable therewith.

8. A shift mechanism as defined in claim 7 wherein said detent means includes a detent plate including a notch defining said park gear position, wherein said U-shaped carrier is movable to a position adjacent said notch defining said park gear position, and said pawl means includes a slideable plate operably connected to said solenoid means and slideably connected to said U-shaped carrier, said slideable plate including a tooth that is movable to engage said notch to retain said shift lever in said park gear position upon actuation of said solenoid means.

9. A shift mechanism for a vehicle having a transmission, comprising:
    detent means defining a park gear position and at least one drive gear position;
    a shift lever operably connected to the transmission and to said detent means, said shift lever being shiftable between said park gear position and at least one drive gear position, said shift lever including a hand grip;
    pawl means for retaining said shift lever in the park gear position, said pawl means being attached to and movable with said shift lever relative to said detent means and movable relative to said shift lever between an engaged condition and a disengaged condition with said detent means;
    solenoid means attached to said pawl means for moving said pawl means between said engaged condition and said disengaged condition to control said pawl means;
    manually actuated switch means operably connected to said solenoid means for controlling said solenoid means, said switch means including a switch located in said hand grip for actuation by an operator;

said detent means including a detent plate having notches therein, at least one of said notches defining said park gear position, and said pawl means including a tooth movably connected to said shift lever and engageable with said detent plate notches to retain sand shift lever in at least said park gear position, and wherein solenoid means includes a solenoid operably connected to said tooth for controlling the engagement of said tooth with said notches;
    said solenoid being fixedly attached to said shift lever and said tooth being movably attached to shift lever, said solenoid and said tooth being movable with said shift lever as said shift lever is moved between said park gear position and said at least one drive gear position.

10. A shift mechanism as defined in claim 9 including a shift mechanism frame adapted to attach to the vehicle, said detent plate being secured to said shift mechanism frame, and wherein said shift lever includes a U-shaped carrier pivotally mounted to said shift mechanism frame and movable adjacent said detent plate, said tooth being movably mounted to said U-shaped carrier.

11. A shift mechanism as defined in claim 10 wherein said solenoid includes a solenoid coil and a solenoid pin operably positioned relative to said solenoid coil, said solenoid pin being connected to said tooth.

12. A shift mechanism as defined in claim 11 wherein said U-shaped carrier includes a saddle bracket, said solenoid coil is fixedly mounted to said saddle bracket, and said tooth is slideably mounted to said U-shaped carrier, said solenoid pin being oriented to extend and move said tooth into engagement with said detent plate upon actuation of said switch means.

13. A shift mechanism for a vehicle having a transmission, comprising:
    detent means defining a park gear position and at least one drive gear position;
    a shift lever operably connected to the transmission and to said detent means, said shift lever being shiftable between said park gear position and at least one drive gear position, said shift lever including a hand grip;
    pawl means for retaining said shift lever in the park gear position, said pawl means being attached to and movable with said shift lever relative to said detent means and movable relative to said shift lever between an engaged condition and a disengaged condition with said detent means;
    solenoid means attached to said pawl means for moving said pawl means between said engaged condition and said disengaged condition to control said pawl means;
    manually actuated switch means operably connected to said solenoid means for controlling said solenoid means;
    a shift mechanism frame adapted to attach to the vehicle, said shift lever being movably mounted to said shift mechanism frame, and wherein said switch means is mounted on said shift lever and movable therewith; and
    said detent means defining a path including said park gear position and said at least one drive gear position, and wherein said shift lever includes a U-shaped carrier movably mounted to said shift mechanism frame and movable along said path, said solenoid means and said pawl means being mounted to said U-shaped carrier and movable therewith.

14. A shift mechanism for a vehicle, the vehicle including a transmission, a steering mechanism for steering the vehicle, an ignition key, an ignition switch defining a "retained" position whereat the steering mechanism is disabled and the key can be removed and also defining at least a "run" position whereat the steering mechanism is enabled and the key cannot be removed, a brake, a brake switch for sensing if the brake is depressed, and a shift lever position switch for sensing if the transmission is in the park gear position, comprising:

detent means defining a park gear position and at least one drive gear position;
 a shift lever operably connected to the transmission and to said detent means, said shift lever being shiftable between said park gear position and at least one drive gear position;
 pawl means for retaining said shift lever in the park gear position, said pawl means being attached to and movable with said shift lever relative to said detent means and movable relative to said shift lever between an engaged condition and a disengaged condition with said detent means;
 solenoid means attached to said pawl means for moving said pawl means between said engaged condition and said disengaged condition to control said pawl means;
 manually actuated switch means operably connected to said solenoid means for controlling said solenoid means; and
 an electrical circuit including said ignition switch, said shift lever position switch, said brake switch, and said manually actuated switch means, said electrical circuit being adapted to disable said solenoid means if the ignition switch is moved from the "run" position to the "retained" position, and also disable said solenoid means when the shift lever position switch is in the park gear position unless the brake is depressed.

15. A shift lever mechanism for a vehicle having a transmission, comprising:

a shift lever movable between a park gear position and one or more drive gear positions, said shift lever including a hand grip;
 pawl means for retaining said shift lever in said park gear position, said pawl means being attached to and movable with said shift lever and further being movable relative to said shift lever between an engaged condition and a disengaged condition;
 solenoid means attached to said shift lever for moving said pawl means between said engaged condition and said disengaged condition to control said pawl means; and
 a switch having an actuator mounted proximate said hand grip and operably connected to said solenoid means for controlling said solenoid means.

16. A shift lever mechanism as defined in claim 15 wherein said switch means for controlling said solenoid means is manually operated.

17. A shift lever mechanism as defined in claim 15 including a detent plate having a notch therein defining said park gear position, and said pawl means includes a slideable plate operably connected to said solenoid means and defining a tooth positioned to engage said notch upon actuation of said solenoid means, whereby said solenoid means controls the movement of said shift lever from said park gear position.

18. A shift lever mechanism for a vehicle, the vehicle including a transmission, a steering mechanism for steering the vehicle, an ignition key, an ignition switch defining a "retained" position whereat the steering mechanism is disabled and the key can be removed and also defining at least a "run" position whereat the steering mechanism is enabled and the key cannot.be removed, a brake, a brake switch for sensing if the brake is depressed, and a shift lever position sensor for sensing if the transmission is in the park gear position, comprising:

a shift lever movable between a park gear position and one or more drive gear positions;
 pawl means for retaining said shift lever in the park gear position, said pawl means being attached to and movable with said shift lever and further being movable relative to said shift lever between an engaged condition and a disengaged condition;
 solenoid means attached to said shift lever for moving said pawl means between said engaged condition and said disengaged condition to control said pawl means;
 switch means attached to said shift lever and operably connected to said solenoid means for controlling said solenoid means; and
 an electrical circuit including said ignition switch, said shift lever position switch, said brake switch, and said manually actuated switch means, said electrical circuit being adapted to disable said solenoid means if the ignition switch is moved from the "run" position to the "retained" position, and also disable said solenoid means when the shift lever position switch is in the park gear position unless the brake is depressed.

19. A shift mechanism for a vehicle having a transmission, comprising:

a shift mechanism frame;
 a shift lever pivotally mounted to said shift mechanism frame and operably connected to the transmission and shiftable between a park gear position and at least one drive gear position;
 a detent plate secured to said shift mechanism frame including at least one notch defining said park gear position;
 a U-shaped carrier secured to said shift lever and movable along said detent plate as said shift lever is moved;
 solenoid means secured to said U-shaped carrier including a solenoid coil and a retractable pin operably connected to said solenoid coil, said pin being normally extended;
 a movable pawl connected to said retractable pin including a tooth, said tooth being engageable with said one notch when said shift lever is in said park gear position;
 a switch located on said shift lever, said switch operably connected to said solenoid coil to actuate said solenoid coil and retract said solenoid pin;
 a handle located on said shift lever including a manually depressible button; and
 means for closing said switch by depressing said manually depressible button, whereby said button can be depressed to actuate said solenoid coil and remove said tooth from said notch defining said retained park position thus allowing said shift lever to be shifted out of said retained park position.

20. A shift mechanism for a vehicle having a transmission, comprising:

a shift lever movable between a park position and one or more drive gear positions, said shift lever defining a plane of movement;

a detent plate having a notched surface defining said gear positions with a particular notch therein defining said park gear positions;

pawl means for retaining said shift lever in said park gear position including a slideable plate having a tooth movable along said plane for engaging said particular notch, said slideable plate being slideably attached to and movable with said shift lever and further being movable relative to said shift lever so that said tooth moves between an engaged condition and a disengaged condition;

solenoid means operably attached between said shift lever and said slideable plate for moving said tooth of said slideable plate between said engaged condition and said disengaged condition to control said pawl means; and switch means attached to said shift lever and operably connected to said solenoid means for controlling said solenoid means.

21. A shift mechanism as defined in claim 20 wherein said shift lever includes a hand grip and a push button located in said hand grip, wherein said switch means includes a switch which is located remote from said push button and said hand grip, and wherein said shift lever further includes a push rod operably connected between said push button and said switch for actuating said switch.

22. A shift mechanism as defined in claim 20 wherein said shift lever includes an elongate post defining a longitudinal direction; and said tooth moves in a direction along said longitudinal direction.

* * * * *